(12) United States Patent
Kaczowka

(10) Patent No.: US 6,654,025 B1
(45) Date of Patent: Nov. 25, 2003

(54) SYSTEM AND METHOD PROVIDING TRANSLUCENT REGION OVER A VIDEO PROGRAM FOR DISPLAY BY A VIDEO DISPLAY DEVICE

(75) Inventor: Peter A. Kaczowka, Townsend, MA (US)

(73) Assignee: Ucentric Holdings, Inc., Maynard, MA (US)

( * ) Notice: Subject to any disclaimer, the term of this patent is extended or adjusted under 35 U.S.C. 154(b) by 299 days.

(21) Appl. No.: 09/649,493

(22) Filed: Aug. 28, 2000

(51) Int. Cl.$^7$ .................................................. G09G 5/02

(52) U.S. Cl. ........................................ 345/592; 345/768

(58) Field of Search ................................ 345/592, 441, 345/629, 768

(56) References Cited

U.S. PATENT DOCUMENTS 5,914,725 A * 6/1999 MacInnis et al. ........... 345/441

\* cited by examiner

*Primary Examiner*—Matthew Luu
(74) *Attorney, Agent, or Firm*—Lucash, Gesmer & Updegrove, LLP

(57) ABSTRACT

A system is disclosed for generating a video signal defining an image for display by a video display device, the video display device displaying at least one image on a video display screen providing a plurality of pixels generally arranged in a plurality of rows. The system comprises a frame buffer, an averaging device, a video signal generator, and a control module. The frame buffer has a plurality of storage locations each configured to store a pixel value, respective storage locations being associated with pixels displayed by the video display device. The averaging device, which in one embodiment is a flicker filter, is configured to receive pixel values from a plurality of storage locations and generate therefrom an average pixel value according to a predetermined function. The video signal generator is configured to receive the average pixel value and generate the video signal therefrom for use by the video display device. The control module is configured to (i) enable pixel values to be stored in the frame buffer, the pixel values comprising, (a) outside of a translucent region to be displayed on the video display screen, image information for the image, and (b) within the translucent region, in storage locations associated with alternating rows of pixels, image information for the image, and in storage locations associated with rows between the alternating rows of pixels, a predetermined pixel value; and (ii) enable pixel values to be retrieved from the frame buffer for use by the averaging device, the control module being configured to enable, for each average pixel value to be generated, pixel values from proximate rows to be retrieved so that, when an average pixel value is generated for a pixel within the translucent region, the average pixel value is the predetermined function of a pixel value comprising image information for the image and the predetermined pixel value, thereby to provide the translucent region.

18 Claims, 4 Drawing Sheets

SYSTEM AND METHOD PROVIDING TRANSLUCENT REGION OVER A VIDEO PROGRAM FOR DISPLAY BY A VIDEO DISPLAY DEVICE

FIELD OF THE INVENTION

The invention relates to the field of providing video information for display by a video display device, and more particularly to systems and methods for providing a translucent region for use in connection with, for example, a video program displayed on a video display screen. The translucent region may be used to provide, for example, enhanced contrast to facilitate easier viewing of a second image, such as a static or dynamic graphical image, on the same video display screen the one on which the video program is displayed.

BACKGROUND OF THE INVENTION

In many environments, it is desired to be able to display, on a video display screen, such as a television receiver or the like on which one image is displayed generally over the screen, a second image which would, for example, occupy a relatively small region of the video display screen. For example, while a viewer is watching a video program such as one obtained over, for example, broadcast, cable, video disk, or other video program source, in the art, it may be desirable to enable the video display device to display information that, for example, relates to the video program being displayed on the video display, including, for example, the name of the program, the source of the program, and the like. Alternatively, it may be desirable to enable the video display device to display other video program information, such as, for example, program schedule information for broadcast or cable, disk menu information if the program source is a video disk, and the like. As another alternative, the information to be displayed may have no relation to the program being displayed. Such information may, for example, be provided from sources selected by the viewer. and may, for example, provide a notification as to the current time and date, indicate current prices of selected stocks, notification of the status of selected features of the viewer's home or other viewing environment, a notification that a telephone call is being received, a notification that an Email message has been received, or any other information that a viewer may wish to have. displayed. This information may be provided in textual form, with the text being shown on the video display screen as a graphical image. Additionally or alternatively, the image may be in non-textual form, such as a graphical icon. The information provided by the image may also be fixed or variable.

The graphical image displayed as the second image as described above may be displayed directly over the video program. However, to, for example, improve the visibility of the graphical image and increase the contrast thereof over the program, it is generally desirable to provide a translucent region in which the graphical image is displayed. In the translucent region, a portion of the video program in the area around the graphical image is obscured, that is, it is not as bright as the program as displayed outside the translucent region. This allows for enhanced contrast between the graphical image and the surrounding display, which, in turn, allows the graphical image to be more easily viewed.

In the past, special hardware has been used to provide translucent regions and graphical images for display by a video display device along with a video program. The special hardware includes two frame buffers, and an "alpha blend" hardware device. Each frame buffer stores information to be displayed by the video display device in digital form. One of the frame buffer is used to store the program to be displayed. The other frame buffer stores the graphical image. For each pixel to be displayed by the video display device, the alpha blend hardware device controls retrieval from one or both frame buffers to obtain pixel information for the program, graphical image, or both, and displays the translucent region and graphical image along with the video program.

SUMMARY OF THE INVENTION

The invention provides a new and improved system and method for providing a translucent region in a video program for, for example, providing enhanced contrast for graphical images superimposed thereover, for display by a video display device such as a television receiver or the like.

In brief summary, a system constructed in accordance with the invention generate a video signal defining an image for display by a video display device, the video display device displaying at least one image on a video display screen providing a plurality of pixels generally arranged in a plurality of rows. The system comprises a frame buffer, an averaging device, a video signal generator, and a control module. The frame buffer has a plurality of storage locations each configured to store a pixel value, respective storage locations being associated with pixels displayed by the video display device. The averaging device, which in one embodiment is a flicker filter, is configured to receive pixel values from a plurality of storage locations and generate therefrom an average pixel value according to a predetermined function. The video signal generator is configured to receive the average pixel value and generate the video signal therefrom for use by the video display device. The control module is configured to:

i. enable pixel values to be stored in the frame buffer, the pixel values comprising,
  (a) outside of a translucent region to be displayed on the video display screen, image information for the image, and
  (b) within the translucent region, in storage locations associated with alternating rows of pixels, image information for the image, and in storage locations associated with rows between the alternating rows of pixels, a predetermined pixel value; and ii. enable pixel values to be retrieved from the frame buffer for use by the averaging device, the control module being configured to enable, for each average pixel value to be generated, pixel values from proximate rows to be retrieved so that, when an average pixel value is generated for a pixel within the translucent region, the average pixel value is the predetermined function of a pixel value comprising image information for the image and the predetermined pixel value, thereby to provide the translucent region.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
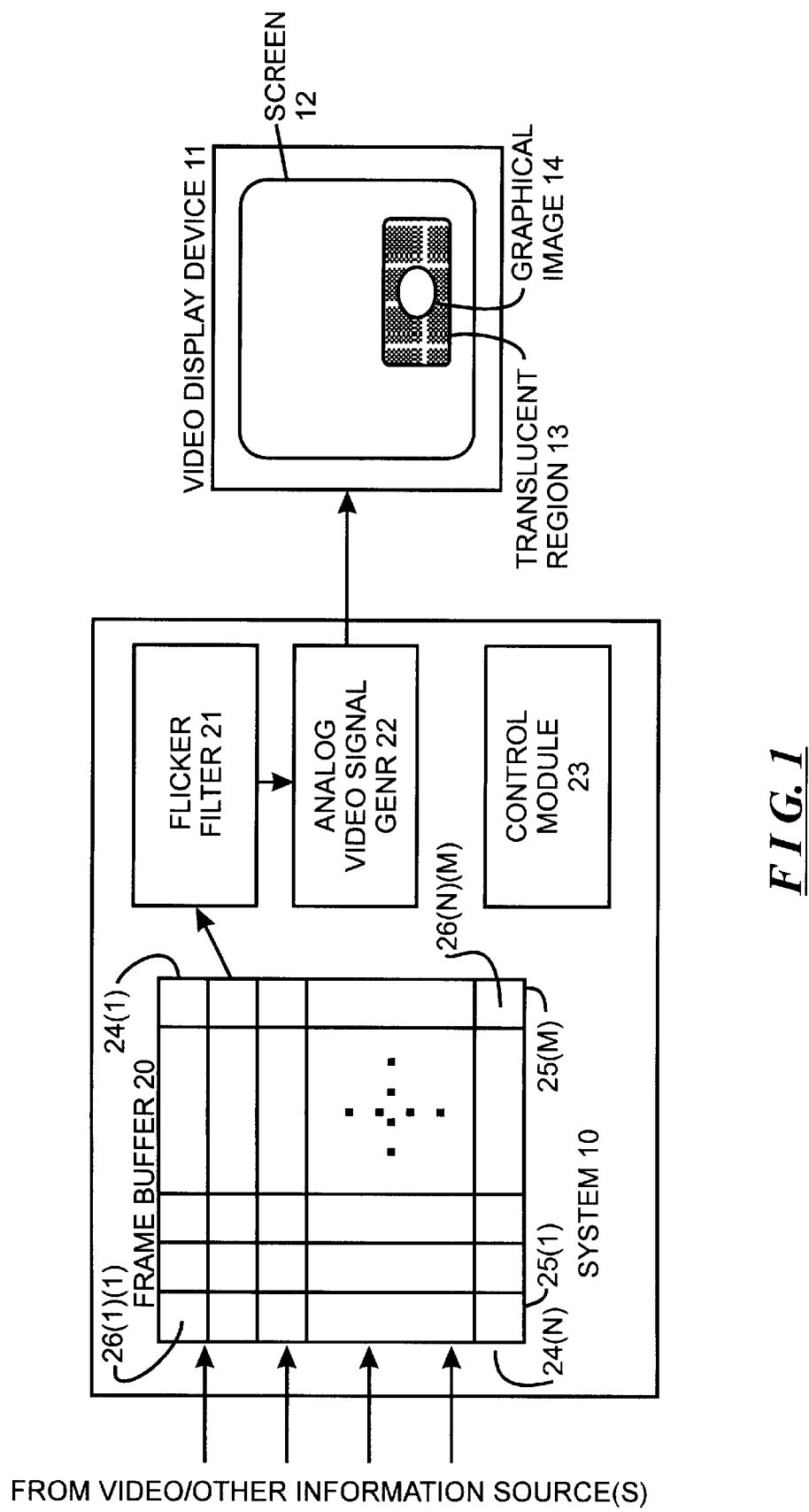
FIG. 1 schematically depicts a system for providing a translucent region over a video program for display on a video display device, constructed in accordance with the invention.

FIG. 1 schematically depicts a system 10 for providing a translucent region in a video program for display on a video display device 11, constructed in accordance with the invention. By way of background, and with reference to FIG. 1, the video display device 1 1 includes a screen 12 that generally displays the video program, and provides a translucent region 13. The region 13 may be of any convenient size, and may, indeed, fill the entire screen 12. The translucent region 13 is generally translucent, partially obstructing the video program but allowing some portion of the video program to appear in the region. The degree to which the region 13 is translucent, that is, the degree to which the video program can show through, is variable, extending from relatively transparent to relatively opaque, as will be described below. Since the region 13 is translucent and partially obscures the portion of the program which is displayed in the region, a graphical image 14 that is displayed therein will be provided with enhanced contrast over the program, which, in turn, allows the graphical image 14 to be more easily viewed by a viewer.

The system 10 includes a frame buffer 20, a flicker filter 21, and an analog video signal generator 22, all of which are controlled by a control module 23. Generally, and under control of the control module 23, the frame buffer 20 receives and stores information, in digital form, from one or more sources, which information will be used to provide the image displayed on the video display screen 12. One information source preferably comprises a source of video program information, which may include, for example, broadcast or cable, video disk, as well as any other type source of video program information as will be apparent to those skilled in the art. If the video program information as provided by the respective source is in analog form, the system 10 can digitize the information before it is stored in the frame buffer 20, in a conventional manner.

Other information sources, which may provide information for use in providing the graphical image 14, may comprise any other source of image information. If, for example, the graphical image 14 is to provide a notification as to the current time and date, the information source therefor may comprise a real-time clock (not separately shown). On the other hand, if the graphical image 14 is to provide a notification as to the current prices of selected stocks, the information source therefor may be one or more World Wide Web sites from which information is provided to the system 10 over, for example, the Internet. If the graphical image 14 is to provide a notification of the status of selected features of the viewer's home or other viewing environment, the information source therefor may comprise a device (not shown) which provides the particular feature whose status is to be displayed, which information may be provided to the system 10 over, for example, a wired or wireless communication link. Similarly, if the graphical image is to provide a notification that a telephone call is being received or that an Email has been received, the information source therefor may comprise a device connected to the respective telephone or Email system, which information may also be provided to the system 10 over a wired or wireless communication link. If the graphical image 14 is to provide information regarding the video program being displayed on the video display screen 14, the information source may be the same as the source of the video program being displayed, perhaps through a different channel as the channel used to provide the video information; alternatively, the information source may be a separate source with the information being provided over, for example, the Internet. If the graphical image 14 is non-textual, such as an icon, the information source used therefor may comprise any source of graphical images. Other sources of various types of textual and non-textual information for use in providing the graphical image will be apparent to those skilled in the art, as well as arrangements for providing them to the system 10.

The frame buffer 20 includes a plurality of storage locations organized in a number "N" of rows 24(1) through 24(N) (generally identified by reference numeral 24(n)) and a number "M" of columns 25(1) through 25(M) (generally identified by reference numeral 25(m)) with the number of rows and columns generally corresponding to the number of row and columns of picture elements ("pixels") that are to be displayed on the video display screen 12. Each storage location will be identified by reference numeral 26(n)(m). The video program information supplied by the video program source is supplied on a frame-by-frame basis, and, generally, except as described below, the control module 23 will enable frames of the digitized video program information to be buffered in the respective storage locations 26(n)(m) in the frame buffer 20 and retrieved from the frame buffer 20 as necessary to be supplied to the downstream components of the system 10, in particular, the flicker filter 21 and the analog video signal generator 22, for processing and generation of an analog video signal.

Generally, during generation of the analog video signal for a pixel 26(n)(m) in the "n-th" row and "m-th" column of pixels on the video display screen12, the flicker filter 21 receives from the frame buffer 20 the pixel information from storage location 26(n)(m), and in addition receives pixel information from storage locations 26(n−1)(m) and 26(n+1)(m), that is, from storage locations associated with pixels in the adjacent rows of the same column as the pixel for which the analog video signal is to be generated. The flicker filter 21 generates a pixel value for the pixel that is the weighted average of the pixel value from storage location 26(n)(m) and the pixel values from storage locations 26(n−1)(m) and 26(n+1)(m), with the weights being selected so as to facilitate reduction or elimination of flicker that can appear in an interlaced video system. For each row, the flicker filter 21 will perform corresponding operations in connection with pixel values received from the frame buffer 20 for successive columns 25(1), 25(2), . . . , 25(M) in each column, for the respective rows 24(1), 24(2), . . . , 24(N). It will be appreciated that, if the video display device 11 uses an interlaced scan methodology, the flicker filter will perform these operations in connection with successive odd-numbered rows (n=1, 3, 5, . . . ) followed by successive even-numbered rows (n=2, 4, 6, . . . ). On the other hand, if the video display device 11 uses a progressive scanning methodology, the flicker filter will perform these operations in connection with successive rows (n=1, 2, 3, . . . ). In either case, however, the flicker filter 21 preferably generates, for the pixel in the "n-th" row and "m-th column of the video display screen 12, the pixel value as the weighted average of the pixel value from storage location 26(n)(m) and the pixel values from storage locations 26(n−1)(m) and 26(n+1)(m) associated with the pixels in the same column and adjacent rows. The flicker filter 21 is particularly useful in reducing flicker than can develop particularly in connection with video display devices that make use of the interlaced scanning methodology.

The analog video signal generator 22 receives the successive pixel values generated by the flicker filter and uses them to generate the analog video signal that is then provided to the video display device 11. Operations performed by the analog video signal generator 22 are conventional and will not be described herein. The video display device 11, in turn, displays the image represented by the analog video signal on the video display screen 12, also in a conventional manner.

As noted above, the system 10 provides a translucent region 13, in which a graphical image 14 may be displayed, with the translucent region 13 partially obscuring the portion of the program which is displayed in the region. This allows the graphical image 14 to be provided with enhanced contrast over the program, which, in turn, allows the graphical image 14 to be more easily viewed by the viewer. The size, shape and position of the translucent region 13, and the identification and position of the particular graphical image 14 to be displayed therein, may be selected by a user, such as a viewer viewing the images as displayed by the video display screen 12 and may be specified by information provided by the user. As with the video program information, the graphical image 14 is defined by pixel values, which are provided by the graphical image source and stored in the frame buffer 20 under control of the control module 23, in the particular storage locations 26(n)(m) as defined by the information provided by the user. If the graphical image 14 as provided by the graphical image source is larger than the size specified by the user, the control module 23 can perform a scaling operation in connection with the information as received from the graphical image source in a conventional manner, The graphical image 14 may be static, in which case after the pixel values defining the graphical image 14 are stored in the frame buffer 20 they need not be updated. On the other hand, the graphical image 14 may be dynamic, in which case the control module 23 may sometimes need to enable the pixel values therefor to be updated.

For portions of the translucent region 13 that are not occupied by the graphical image 14, the control module 23 enables digital information to be stored that will generally provide a translucent image of the same video program that is being displayed outside of the translucent region 13. The translucent image enhances the contrast between the graphical image 14 and the video program, thereby making the viewing of the graphical image 14 easier and more pleasant to the viewer. Generally, the translucency on the video display screen 12 is provided by combining the video program in the translucent region 13 with a gray pattern that tends to partially mask and gray out the video program, thereby reducing its intensity from that outside the translucent region 13 on the video display screen 12. The control module 23 accomplishes this be enabling the pixel information representing the video program information to be stored in the storage locations 26(n)(m) In the frame buffer 20 that are associated with alternating rows of pixels on the video display screen 12. For the pixels in the rows therebetween the control module 23 enables digital information representing a selected shade of gray to be stored in the storage locations 26(n)(m) of the frame buffer 20 that are associated therewith. Thus, for example, the control module 23 may enable video program information to be stored in storage locations 26(n)(m) in the fame buffer 20 associated with pixels in rows 24(n) and 24(n+2) of the video display screen 12, and in storage locations 26(n)(m) in the frame buffer 20 that are associated with row 24(n+1) the control module 23 will enable pixel information to be stored representing the selected shade of gray. It will be appreciated that the pixel values from the video program that are stored in row 24(n+2) of the frame buffer 20 will comprise those values that would normally be stored in row 24(n+2), and not row 24(n+1), to which otherwise might result in an undesirable expansion or distortion of the images comprising the video program.

Accordingly, when the flicker filter 21 processes the portions of the rows 24(n) stored in the frame buffer 20 containing storage locations 26(n)(m) that are associated with pixels in the region 13, as described above, it will be appreciated that it (that is, the flicker filter) will generate pixel values that are a weighted combination of the video program information and the selected shade of gray. For example, if, in processing a pixel value stored in a storage location 26(n)(m) in a row 24(n) that contains pixel values from the video program, the flicker filter 21 will generate a pixel value that is a weighted average of the pixel value from the video program and pixel values defining the selected shade of gray obtained from storage locations 26(n−1)(m) and 26(n+1)(m). On the other hand, if, in processing a pixel value stored in a storage location 26(n')(m') in a row 24(n') that contains pixel values defining the selected shade of gray, the flicker filter will generate a pixel value that is a weighted average of the pixel value defining the selected shade of gray and pixel values from the video program obtained from storage locations 26(n'−1)(m) and 26(n+1)(m). Depending on the selected shade of gray and the weighting factor that is selected for use in generating the weighted average, it will be appreciated that the region 13 outside of the graphical image 14 can be made to be relatively dark, if the selected shade of gray is relatively dark, or relatively light, if the selected shade of gray is relatively light, and so the degree of translucence, from generally opaque to generally transparent, can be adjusted by adjusting the selected shade of gray. In addition, the degree of translucence can be varied or textured by varying the selected shade of gray as among the pixels in the portion of the region 13 outside of the graphical image 14. In addition, the color of the portion of the video program in the region 13 can be modified or adjusted by specifying that, instead of using pixel values defining the selected shade of gray, pixel values defining a non-gray color be used instead.

Figure 2:
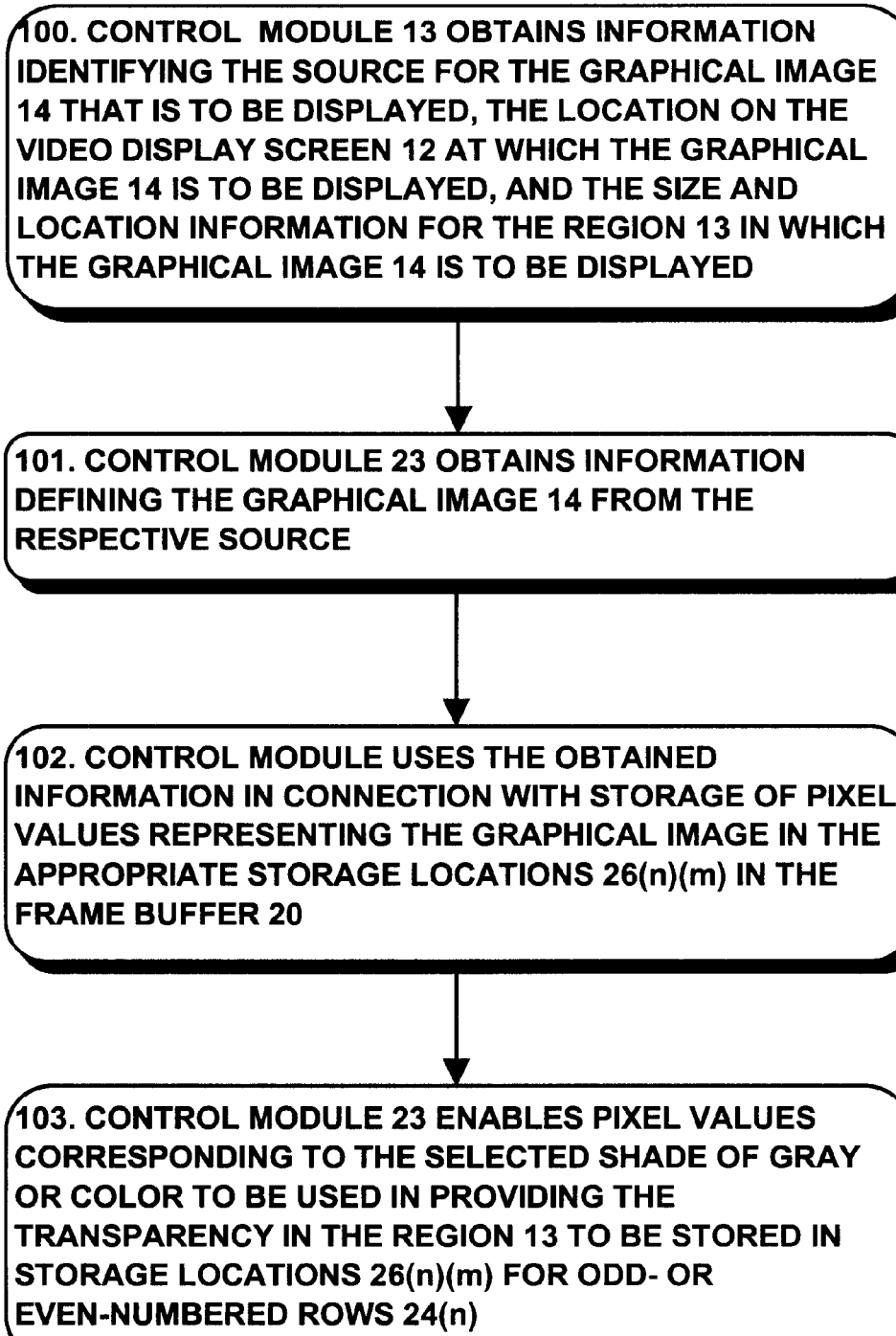
FIGS. 2, 2A and 2B depicting operations performed by the system in connection with providing the translucent region.

It will be appreciated that one benefit of the system 10 is that, instead of requiring the provision of special devices, whether implemented in hardware or software, to provide for the translucence in the translucent region 13, the system 10 achieves translucence by providing alternating rows of the selected shade of gray, or non-gray color, in the storage locations 26(n)(m) of the frame buffer 20 associated with the translucent region 13. Operations performed by the control module 23 in connection with controlling storage of information in the frame buffer 20 to facilitate providing the translucent region 13 for the graphical image 14 will be described in connection with FIG. 2. In providing the translucent region 13 and graphical image 14, the control module 23 will initially obtain from, for example, a user information identifying the source of the graphical image 14 that is to be displayed, the location on the video display screen 12 at which the graphical image 14 is to be displayed, and the size and location for the translucent region 13 in which the graphical image 14 is to be displayed (step 100). It will be appreciated that there may be a default source and/or default position for the graphical images to be displayed on the video display screen 12 as the graphical image 14, in which case, if that information is not provided in step 100, the control module 23 can use the default information in deter the source of the graphical image to be displayed and/or the location on the video display screen 12 at which the graphical image 14 is to be displayed. Alternatively, or in addition, there may be a default size and/or location of the translucent region 13 on the video display screen 12, and/or a default size of the translucent region 13 relative to the size of the graphical image 14, and the control module 23 can use that information in determining the size and/or location of the translucent region 13 on the video display screen 12. In particular, it will be appreciated at the control module 23 may be provided with the identification of the source of the graphical image 14, the position on the video display screen 12 at which the graphical image 14 is to be displayed, and the size and location of the translucent region 13 on the video display screen 12 may be provided using a number of diverse mechanisms, any of which may be utilized by the control module 23.

After the control module 23 has been provided with information as to the source of the graphical image 14 and the location on the video display screen 12 at which the graphical image 14 is to be displayed in step 100, it (that is, the control module 23) can obtain information defining the graphical image 14 from the source (step 101), and use that information in connection with storage of pixel values representing the graphical image in the appropriate storage locations 26(n)(m) in the frame buffer 20 (step 102). It will be appreciated that the information defining the graphical image 14 can be in any form, including a bitmap specifying the image bit-by-bit, in compressed or encoded form using any convenient compression methodology, in ASCII text form, or any other convenient form. If the information defining the graphical image 14 is in bitmapped form, it will be appreciated that the information will comprise pixel values that the control module 23 may be able to store the information in the frame buffer 20 directly. Alternatively, the control module 23 may need to perform some pre-processing operations, such as scaling the information if the size of the information defines a graphical image that would be larger than is to be displayed on the video display screen 12, normalizing the information if the pixel values defined thereby are, for example, 44 specified by a different number of binary digits that differ from the number that is used by the system 10, or to perform any of a number of other operations as will be apparent to those skilled in the art. If the information defining the graphical image is in compressed or encoded form, in ASCII text form, or any other form, the control module can use the information to generate a bitmap that is stored in the appropriate storage locations 26(n)(m) in the frame buffer 20. In addition, for portions of the region 13 outside of that occupied by the graphical image 14, the control module 23 will enable pixel values corresponding to the selected shade of gray or color to be used in providing the transparency in the region 13 to be stored in storage locations 26(n)(m) for odd- or even-numbered rows 24(n) (step 103).

At this point, the control module 23 will have finished enabling information to be stored in the frame buffer 20 to facilitate display of the graphical image 14 and provide translucence in the portion of the region 13 outside of the graphical image 14. The control module 23 will continue enabling video program information to be stored in the frame buffer 20; however, in those operations, the control module 23 will need to ensure that the video program information does not over-write the pixel values that were stored in the frame buffer in steps 102 and 103. Accordingly, when the system 10 receives a pixel value from the video program source, it will need to determine whether the pixel value is to be stored in the frame buffer 20 or discarded. It will be appreciated that, if a pixel value is received for a pixel that is outside of the region 13, it will be stored in the appropriate storage location 26(n)(m) in the frame buffer 20. If the pixel value is for a pixel that is inside of region 13, it will also be stored in the storage location 26(n)(m) in the frame buffer 20 unless (i) the pixel is in the portion of the region that is occupied by the graphical image 14, or (ii) the pixel is in the portion of the region that is not occupied by the graphical image 14, but it is in a row 24(n) in which were stored pixel values corresponding to the selected shade of gray or color to be used in providing the transparency in the region 13 in step 103.

Figure 2A:
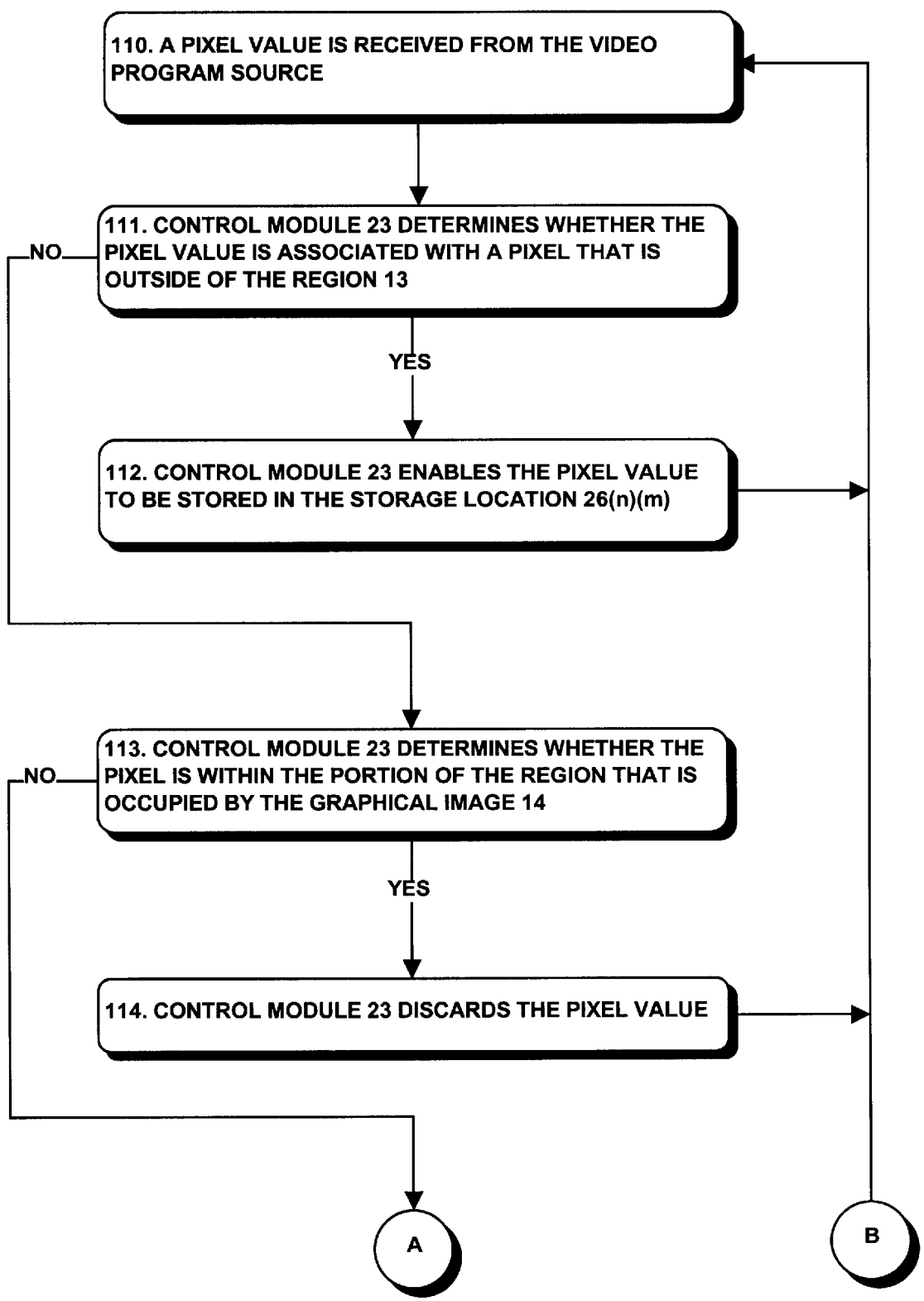
Figure 2B:
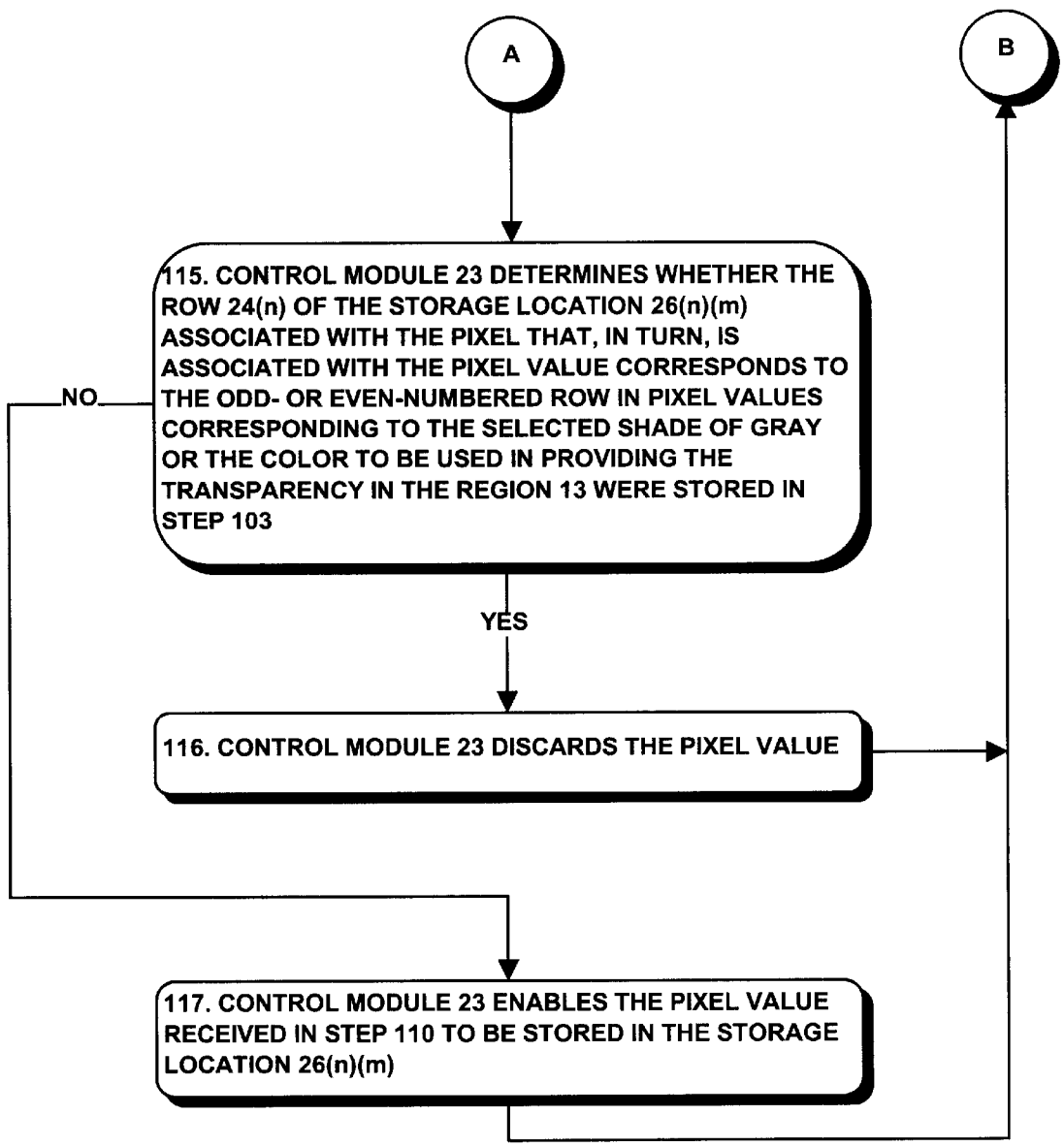

Accordingly, and with continued reference to FIG. 2A, when a pixel value is received from the video program source (step 110), the control module 23 will initially determine whether the pixel value associated with a pixel that is outside of the translucent region 13 (step 111). In that operation, the control module 23 can determine whether the pixel value is to be stored in a storage location 26(n)(m) associated with a row 24(n) and column 25(m) outside the range corresponding to those storage locations 26(n)(m) with the pixels comprising the translucent region 13. If the control module 23 makes a positive determination in step 111, it will enable the pixel value to be stored in the storage location 26(n)(m) (step 112) and return to step 110 to receive the next pixel value.

Returning to step 111, if the control module 23 makes a negative determination in that step, that is, if it determines that the pixel value received in step 10 is associated with a pixel that is inside of the translucent region 13, it can initially determine whether the pixel is within a portion of the translucent region 13 that is occupied by the graphical image 14 (step 113). If the control module 23 makes a positive determination in step 113, it will discard the pixel value (step 114) and return to step 110 to receive the next pixel value.

On the other hand, if the control module 23 makes a negative determination in step 113, which will be the case if the pixel is outside of the portion of the translucent region 13 that is occupied by the graphical image 14, but still within the translucent region 13, the control module 23 determines whether the row 24(n) of the storage location 24(n)(m) associated with the pixel, that, in turn, is associated with the pixel value that corresponds to the odd- or even-numbered row in pixel values corresponding to the selected shade of gray or the non-gray color to be used in providing the translucency in the translucent region 13 were stored in step 103 (step 115). It will be appreciated that the control module 23 can be the determination in step 115 by examining the low-order binary digit of the index "n" of the row 24(n) containing the storage location 26(n)(m) associated with the pixel that is, in turn, associated with the pixel value. If the control module 23 stored the pixel value corresponding to the selected shade of gray or the non-gray color to be used in providing the translucency in the translucent region 13 in the odd-numbered rows, then the low-order binary digit of the index "n" will be "one"; accordingly, if the low-order binary digit of the index "n" of the row 24(n) containing the storage location 26(n)(m) associated with the pixel that is, in turn, associated with the pixel value is also a "one", the control module 23 will make a positive determination. Contrariwise, if the control module 23 stored the pixel values corresponding to the selected shade of gray or the non-gray color used in providing the translucency in the translucent region 13 in the even-numbered rows, then the low-order binary digit of the index "n" will be a "zero";

accordingly, if the low-order binary digit of the index "n" of the row 24(n) containing the storage location 26(n)(m) associated with the pixel that is, in turn, associated with the pixel value is also a "zero", the control module 23 will make a positive determination. In either case, if the control module 23 does make a positive determination in step 115, it will also discard the pixel value (step 116) and return to step 110 to receive the next pixel value. However, if the control module 23 make a negative determination in step 115, it will enable the pixel value received in step 110 to be stored in the storage location 26(n)(m) (step 117) and return to step 110 to receive the next pixel value.

It will be appreciated that the control module 23, by discarding the pixel values from the video program source that are associated with all pixels in the portion of the translucent region 13 that are occupied by the graphical image 14 (step 113), will ensure that the video program information from the video program source does not over-write the pixel values stored in the frame buffer 20 in which the pixel values for the graphical image 14 are stored. Similarly, the control module 23, by discarding pixel values from the video program source that are associated with pixels in the portion of the translucent region 13 that are associated with the selected shade of gray or the non-gray color to be used in providing translucency in the translucent region 13, will ensure that the video program information from the video program source does not over-write the pixel values stored in the frame buffer 20 in which pixel values for the selected shade of gray or non-gray color providing the transluency in the translucent region 13 are stored. This will ensure that, when the system 10 uses the stored pixel values to generate the analog video signal as described above, the graphical image 14 will be displayed along with the translucent region 13.

The invention provides a number of advantages. In particular, the invention provides an arrangement for providing a translucent region 13 surrounding a graphical image 14 on a video display without requiring special hardware or other expensive arrangements. In addition, the invention allows the degree of opacity or transparency and color tone of the translucent region 13 to be easily controlled by controlling the shade of gray or color tone represented by the pixel values in the alternating rows of the translucent region 13.

It will be appreciated that a number of modifications may be made to the system 10 as described above. For example, the system 10 has been described as providing an analog video signal for use in connection with a video display device 11. It will be appreciated that, if the video display device can receive and use digital video input signals, the system 10 can provide the digital video signal instead of, or in addition to, analog video signal. In that case, the system 10 may include a digital video signal generator (not shown) instead of or in addition to the analog video signal generator 22 for generating the digital video signal. On the other hand, since the output of the flicker filter 21 is in digital form, if the video display device 11 can make use of the output of the flicker filter 21 directly, the system 10 may not need to be provided with a digital video signal generator.

In addition, although the system 10 has been described in connection with display of a static graphical image 14, it will be appreciated that the graphical image 14 may instead be dynamic, that is, change over time. For example, the graphical image 14 as provided by the graphical image source may comprise text that is updated on a periodic or non-periodic basis. In that case, when updated text is received from the graphical image source, the control module 23 can perform operations described above in connection with steps 100 through 104 to enable the pixel values for the updated text to be generated and stored in the appropriate storage locations in the frame buffer 20 to enable the text to be displayed on the video display screen as a graphical image. In addition, the operations will be such as to update the storage locations in the translucent region 13 with the appropriate pixel values for the selected shade of gray or color tone for the region 13, since some the graphical image of the updated text may not occupy all of the areas of the translucent region 13 occupied by the previous text, and it will be necessary to provide translucence in those areas.

Furthermore, although the flicker filter 21, when it generates a pixel value for a pixel using the contents of a storage location 26(n)(m) from a row 24(n), has been described as making use of the contents of storage locations 26(n−1)(m) and 26(n+1)(m) from adjacent rows 24(n−1) and 24(n+1), it will be appreciated that the flicker filter 21 may also make use of the contents of storage locations 26(n−2)(m), . . . , 26(n+2)(m), . . . in other rows 24(n−2), . . . , 24(n+2), . . . proximate thereto.

In addition, although the pixel values for the select shade of gray or color tone have been described as being stored in storage locations in alternating rows 24(n), 24(n+2), . . . in the frame buffer 20, it will be appreciated that will be the case if, as in the embodiment described herein, the video display device 11 scans horizontally. On the other hand, if the video display device 11 scans in a different direction, pixel values will be retrieved from the frame buffer 20 in the direction of the scan, in which case, the pixel values for the selected shade of gray or color tone will preferably be stored in that particular direction. For example, if the video display device 11 scans in a vertical direction, the pixel values for the selected shade of gray or color tone will preferably be stored in alternating columns 25(m), 25(m+2), . . . in the translucent region. In that case, the control module 23 will enable pixel values to be retrieved from the frame buffer 20 along columns 25(m) instead of rows 24(n), and so the flicker filter 21 will be generating a pixel value for use by the analog video signal generator 22 as the weighted average of a pixel value from the storage location 26(n)(m) and storage locations 26(n)(m−1) and 26(n)(m+1) in the same row, but in adjacent columns.

Furthermore, although the invention have been described in connection with providing a translucent region in an image displayed on a video display screen which otherwise displays a video program, it will be appreciated that the video display screen may instead display a static image.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for generating video signals defining a video image of a video program, a translucent region that partially obstructs the video image, and a graphical image for display by a video display device, the video display device including a video display screen having a plurality of pixels generally arranged in a plurality of tows for displaying the video image, the translucent region, and the graphical image, the system comprising:

a frame buffer having a plurality of storage locations arranged in rows corresponding to the plurality of pixels of the video display screen, and wherein each storage location is configured to store a pixel value, said plurality of storage locations including first storage locations defining the graphical image to be displayed on the video display screen within the translucent region during display of the video image;

second storage locations excluding said first storage locations that define the translucent region to be displayed on the video display screen during display of the video image, said second storage locations forming a plurality of rows, and an averaging device configured to receive pixel values from said plurality of storage locations and to generate therefrom a succession of average pixel values according to a predetermined function;

a video signal generator configured to receive the successive average pixel values and generate the video signals therefrom for display of the video image, the translucent region, and the graphical image on the video display screen; and a control module operative to control storage of the pixel values for the video image, the translucent region, and the graphical image in said plurality of storage locations in said frame buffer wherein pixel values for the graphical image are stored in said first storage locations of said frame buffer;

pixel values for the video image corresponding to said first storage locations of said frame buffer are discarded, pixels having a predetermined pixel value are stored in alternating rows of said second storage locations of said frame buffer, pixel values for the video image corresponding to said alternating rows of said second storage locations of said frame buffer are discarded, pixel values for the video image corresponding to rows between said alternating rows of said second storage locations of said frame buffer are stored in said rows, and pixel values for the video image outside of the translucent region are stored in the remaining storage locations of said plurality of storage locations;

said control module being further operative to retrieve pixel values from storage locations of proximal rows of said frame buffer for use by said averaging device to generate the succession of average pixel values wherein each of the successive average pixel values for each storage location of said rows of the translucent region is the predetermined functions of the pixel value of the video image from one of said rows and the predetermined pixel values from said alternating rows proximate said one row or the predetermined pixel value from one of said alternating rows and the pixel values of the video image from said rows proximate said alternating row, as applicable.

2. The system of claim 1 wherein said predetermined pixel value of the pixels stored in said alternating rows of said second storage locations defines a selected shade of gray.

3. The system of claim 1 wherein said predetermined pixel value of the pixels stored in said alternating rows of said second storage locations defines a non-gray color.

4. The system of claim 1 wherein said predetermined function is a weighted averaging function.

5. The system of claim 1 wherein said control module is further operative to dynamically change the graphical image.

6. The system of claim 5 wherein the graphical image is a video image.

7. A method of providing a translucent region having a graphical image displayed therein in a video image of a video program displayed on a video display screen, the video display screen having a plurality of pixels generally arranged in a plurality of rows for displaying the video image, the translucent region, and the graphical image, the method comprising the steps of:

providing a frame buffer having a plurality of storage locations arranged in rows corresponding to the plurality of pixels of the video display screen, each storage location being configured to store a pixel value;

defining first storage locations within the plurality of storage locations for the graphical image to be displayed on the video display screen within the translucent region during display of the video image;

defining second storage locations excluding the first storage locations within the plurality of storage locations for the translucent region to be displayed on the video display screen during display of the video image, the second storage locations forming a plurality of rows;

storing pixel values of the graphical image in the first storage locations of the frame buffer;

discarding pixel values of the video image corresponding to the first storage locations of the frame buffer;

storing a predetermined pixel value in alternating rows of the second storage locations of the frame buffer;

discarding pixel values of the video image corresponding to the alternating rows of the second storage locations of the frame buffer;

storing pixel values of the video image in rows between the alternating rows of the second storage locations in the frame buffer;

storing pixel values of the video image outside of the translucent region in the remaining storage locations of the plurality of storage locations; and generating average pixel values for the translucent region by taking a predetermined function of the pixel values of the video image retrieved from each row and the predetermined pixel value retrieved from the alternating rows proximal the row or the predetermined pixel value retrieved from each alternating row and the pixel values of the video image retrieved from the rows proximal the alternating row, as applicable.

8. The method of claim 7 wherein the predetermined pixel values stored in the alternating rows of the second storage locations defines a selected shade of gray.

9. The method of claim 7 wherein the predetermined pixel values stored in the alternating rows of the second storage locations defines a non-gray color.

10. The method of claim 7 wherein the predetermined function is a weighted averaging function.

11. The method of claim 7 further comprising the step of dynamically updating the pixel values of the graphical image stored in the first storage locations of the frame buffer.

12. The method of claim 11 wherein the graphical image is a video image.

13. A computer program product for use in a computer system that includes a frame buffer for storing pixel values for and a display screen for displaying at least one image, a translucent region that partially obstructs the at least one image, and a graphical image, the display screen having a plurality of pixels generally arranged in a plurality of rows and the frame buffer having a plurality of storage locations arranged in rows corresponding to the plurality of pixels of the display screen, the computer program product comprising a computer-readable medium having encoded thereon:

a pixel value storage control module that is operative to
define first storage locations within the frame buffer for the graphical image to be displayed on the display screen within the translucent region during display of the at least one image,
define second storage locations excluding the first storage locations within the frame buffer for the translucent region to be displayed on the display screen during display of the at least one image wherein the second storage locations form a plurality of rows,
store pixel values of the graphical image in the first storage locations of the frame buffer,
discard pixel values of the at least one image corresponding to the first storage locations of the frame buffer,
store a predetermined pixel value in alternating rows of the second storage locations of the frame buffer,
discard pixel values of the at least one image corresponding to the alternating rows of the second storage locations of the frame buffer,
store pixel values of the at least one image in rows in the second storage locations of the frame buffer that are between the alternating rows, and
store pixel values of the at least one image in the remaining storage locations of the plurality of storage locations in the frame buffer; and a pixel value retrieval control module that is operative to retrieve pixel values from storage locations of proximal rows of the frame buffer and generate a succession of average pixel values wherein each or the successive average pixel values for each storage location of the rows of the translucent region is a predetermined function of the pixel value of the at least one image from one of the rows and the predetermined pixel values from the alternating rows proximate the one row or the predetermined pixel value from one of the alternating rows and the pixel values of the at least one image from the rows proximate the alternating row, as applicable.

14. The computer program product of claim 13 wherein the predetermined pixel values stored in the alternating rows of the second storage locations defines a selected shade of gray.

15. The computer program product of claim 13 wherein the predetermined pixel values stored in the alternating rows of the second storage locations defines a non-gray color.

16. The computer program product of claim 13 wherein the predetermined function is a weighted averaging function.

17. The computer proven product of claim 13 wherein the pixel value storage control module is further operative to dynamically update the graphical image.

18. The computer program product of claim 17 wherein the graphical image is a video image.

* * * * *